Sept. 20, 1955  D. F. COLLINS ET AL  2,718,030
MOLD MANIPULATING APPARATUS
Filed Sept. 2, 1954  2 Sheets-Sheet 1

Inventor
Don F. Collins
By
Oldham & Oldham
ATTORNEYS

Sept. 20, 1955 D. F. COLLINS ET AL 2,718,030
MOLD MANIPULATING APPARATUS
Filed Sept. 2, 1954 2 Sheets-Sheet 2

Inventor
Don F. Collins
By
Oldham & Oldham
ATTORNEYS

२,७१८,०३०
Patented Sept. 20, 1955

2,718,030

MOLD MANIPULATING APPARATUS

Don F. Collins, Pontiac, Mich., and Forrest L. Dawes, Kent, Ohio, assignors to Adamson United Company, Akron, Ohio Application September 2, 1954, Serial No. 453,922

9 Claims. (Cl. 18—17)

This invention relates to mold-manipulating apparatus, and, more particularly, to apparatus for automatically removing a cavity mold from a press, opening the mold, ejecting the molded article, and returning the empty mold to the press.

Molds used in vulcanizing of rubber articles are subjected to high temperature and pressure. Such molds are difficult to open or separate, and furthermore, the heated molds are difficult and uncomfortable to handle manually. While various means have been advanced in the prior art for mechanically removing molds from a vulcanizing press or for breaking open the mold sections, such operations have not generally been combined in a single automatic apparatus. Where such apparatus has been developed to perform all the operations incident to removing, breaking open, ejecting, and returning the molds to the vulcanizing press, such apparatus has been complicated and expensive. Such mold-serving apparatus has generally been tailored to function only in conjunction with a particular press or to handle a particular shape and size mold, and as such is not readily adaptable to the type of press described in applicant's co-pending application, Serial No. 228,912, filed May 29, 1951, now abandoned.

It is the general object of this invention to avoid and overcome certain of the foregoing and other difficulties of and objections to the prior art practices by the provision of mold-manipulating apparatus which is less complicated, automatic in operation, faster, and more efficient.

Another object of this invention is to provide apparatus which removes a mold from a hydraulic vulcanizing press without removing the pressure from the press platens.

Another object of this invention is to provide apparatus which automatically opens the sections of the molds to disclose the cavities for removing the molded articles therefrom.

Another object of the invention is the provision of apparatus for returning the closed molds to a point between the press platens, the molds being again submitted to the full pressure of the press.

Another object of the invention is to provide mold-manipulating means which accomplishes the above-named operations in sequential order and in a manner which may be made automatic so as not to require the attention of an operator.

These and other objects of the invention which will become apparent as the description proceeds are achieved by the provision of mold-manipulating apparatus for removing, opening, and returning a two-part mold that is normally carried between platens of a vulcanizing press, the apparatus including a main frame which extends on either side of the press. A carriage slidably supported by the main frame adjacent one side of the press is hydraulically actuated to move a plurality of hydraulic jacks, which are situated in two spaced rows, into position on either side of the mold between the platens, the jacks being actuated to force the platens apart against the pressure of the press for releasing the mold. A pair of guides are secured to the main frame adjacent the opposite side of the mold from the carriage and the lower mold section is provided with longitudinal grooves which slidably engage between the guides when the mold is pushed out from between the platens. Hydraulically actuated ram means engage the mold for pushing the mold in and out of position between the platens. A vertical carriage is slidably supported by the main frame directly above the guides and pivotally supports a rack which is normally held horizontal by spring means. The rack is so positioned as to slidably engage grooves in the upper section of the mold so that when the mold is pushed out between the platens by the ram, the two sections of the mold are gripped by the guides and rack respectively. Hydraulic motor means is provided for raising the vertical carriage to separate the mold sections. A hook on the side of the top section of the mold engages pin means secured to the main frame whereby the mold half is tipped from the horizontal against the action of the spring means as the vertical carriage lifts the rack.

For a better understanding of the invention, reference should be had to the accompanying drawings, wherein.

Figure 1:
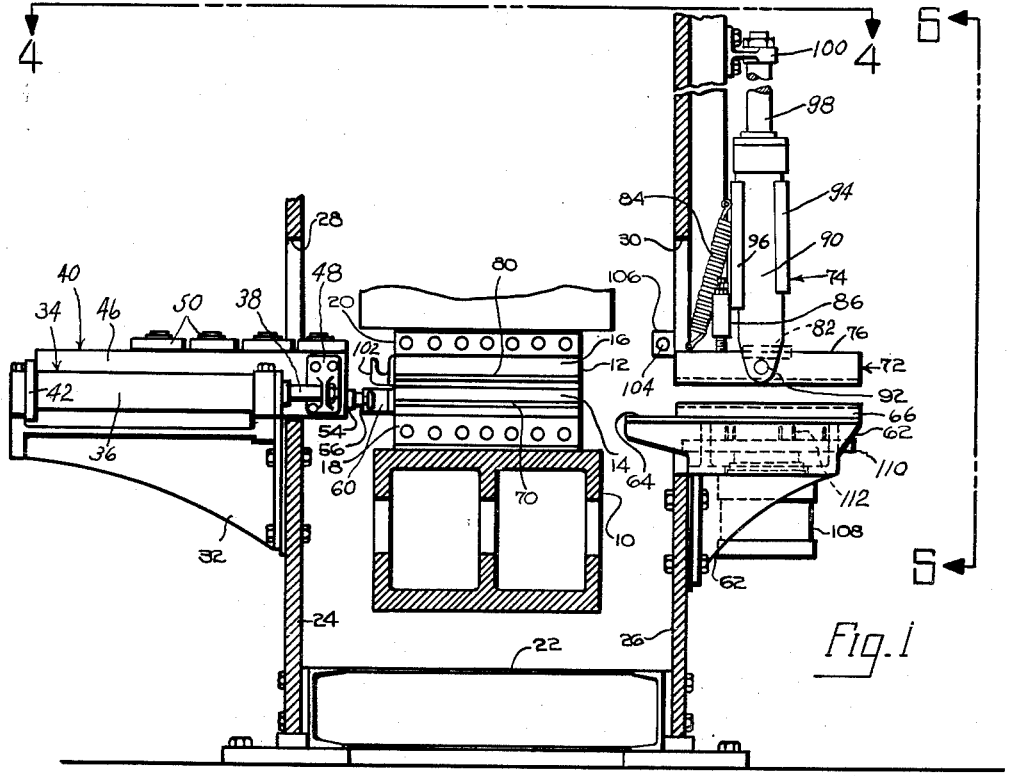
Fig. 1 is an elevational view, partly in section, of the invention.
Figure 2:
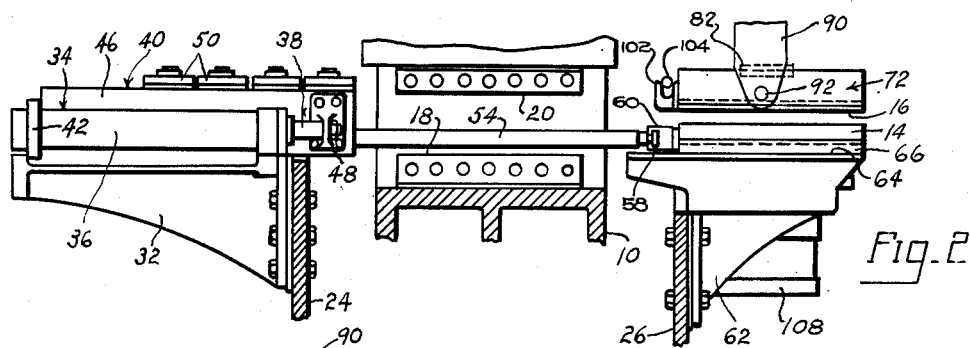
Fig. 2 is a fragmentary elevational view similar to Fig. 1 but showing the mold removed from between the press platens.

Before considering the construction of the invention in detail, it should be understood that the invention as described is particularly adapted for operation in conjunction with a vulcanizing press, such as the rotary type molding press described in the above-mentioned co-pending application. In such a press, a plurality of split-cavity molds are moved in an endless path and are successively removed and serviced at one point. Such a press includes an annular rim, a portion of which is shown in the drawings and indicated by the numeral 10. The molds are circumferentially spaced around the inner diameter of the rim 10, pressure being applied radially outwardly against the molds by hydraulic motor means between a central hub and the inner side of each mold. One such mold is indicated in the drawings by the numeral 12 and is of the split mold cavity type including two sections 14 and 16. The molds are normally frictionally held between platens 18 and 20 by the pressure exerted by the press.

The main frame of the press, indicated at 22, includes two vertical side portions 24 and 26 provided with openings 28 and 30 respectively upon opposite sides of the mold 12 and of the press. Directly below the opening 28 is bolted or otherwise secured a carriage support bracket 32. Bolted in spaced parallel relation to the carriage support bracket 32 are a pair of hydraulic motors 34 having cylindrical portions 36 and fluid-actuated plungers 38.

Figure 4:
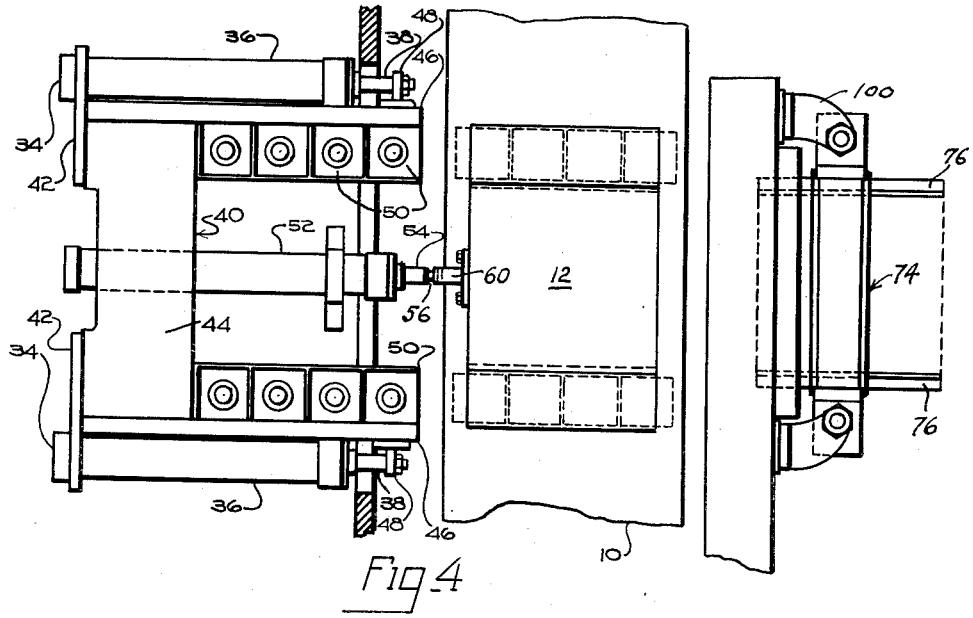
Fig. 4 is a plan view of the invention with portions of the vulcanizing press included.
Figure 5:
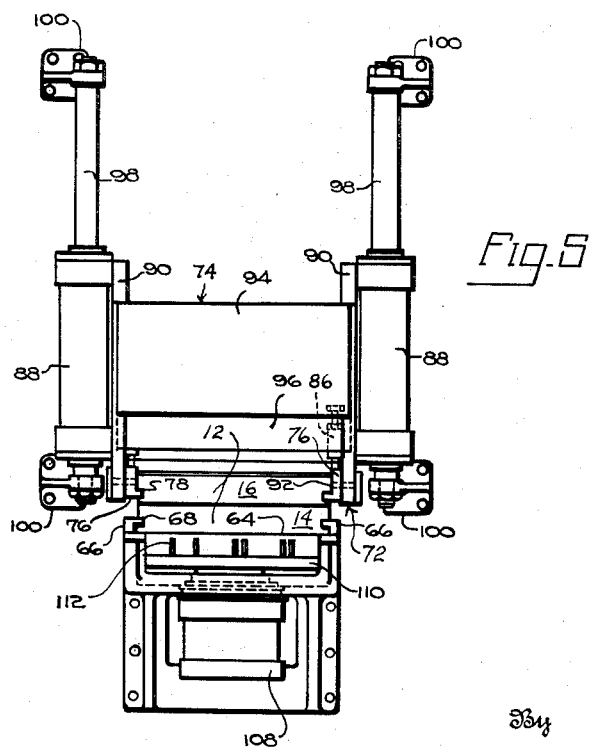
Fig. 5 is a fragmentary elevational view of the vertical carriage in position just prior to the opening of the mold halves.

A carriage frame, indicated generally at 40, is slidably supported for horizontal movement toward and away from the mold 12. The carriage 40 includes guide portions 42 which encircle and slidably engage the outer cylindrical surface of the cylinders 36. The carriage further includes a spanning member 44 and a pair of side members 46 which are preferably welded into a unit as particularly shown by Fig. 4. Bolted or otherwise secured to the end of the side members 46 opposite from the guide members 42 are a pair of brackets 48 which are secured to the ends of the plungers 38 whereby movement of the plungers imparts a horizontal movement to the carriage 40.

Secured to the inner face of each of the side members 46 is a plurality of hydraulic jacks 50, there being preferably four jacks on each side. The spacing between the rows of hydraulic jacks is such that when the carriage is moved forward by the plungers 38, the rows of jacks straddle the mold 12 and are moved into position on either side of the mold between the platens 18 and 20. Hydraulic fluid under pressure is delivered in any suitable manner to the hydraulic jacks, the pressure being applied when the jacks are in position between the platens. Sufficient force is generated by the jacks to force the platen 20 out of contact with the top of the mold 12 against the force of the press which is continuously applied to the upper platen 20. The jacks 50 overcome the pressure of the press, thus relieving the mold 12 from the vise-like grip between the platens.

A second hydraulic motor 52 is mounted on the carriage support brackets 32. The plunger 54 actuated by the hydraulic motor 52 has an annular groove 56 adjacent the outer end thereof forming a T-shaped end which is adapted to engage a T-slot 58 in a bracket 60 secured to the lower half 14 of the mold 12. The grooved plunger 54 is so positioned that as the mold is indexed into position, the T-slot receives the plunger end.

Secured to the main frame 26 adjacent the openings 30 is a mold-supporting bracket 62, the top surface 64 of which is in a plane with the top of the platen 18 so that as the mold 12 is pushed by means of the plunger 54 from out between the platens 18 and 20, it slides onto the surface 64. Mounted on top of the mold-supporting bracket 62 along the marginal edges thereof in spaced parallel relation are a pair of guides 66 having tongue portions 68 adapted to engage longitudinally extending grooves 70 on either side of the lower portion 14 of each mold. Thus, as the mold is pushed forward onto the supporting bracket 62, the lower half of the mold is gripped by the tongue portions 68 of the guides 66 and held against movement in any direction except the motion initiated by the plunger 54.

To provide means for separating the mold halves after the mold is pushed out onto the mold-supporting bracket 62, a rack 72 is provided which is pivotally supported from a vertically movable carriage indicated generally at 74. The rack 72 includes a pair of spaced guide members 76 having tongues 78 which engage longitudinally extending grooves 80 along the edge faces of the upper half 16 of the mold. A cross member 82 is welded or otherwise secured along the top edges of the guide portions 76 of the rack to complete the rack structure.

The rack 72 is normally held horizontal by means of tension springs 84 which are secured between the inner ends of the guides 76 and the vertical carriage 74. An adjustable stop 86, secured to the vertical carriage, adjusts the normal position of the rack 72 so that the tongue portions 78 are in exact alignment with the grooves 80 in the molds when the mold is pushed onto the supporting surface 64.

The vertical carriage 74 includes a pair of spaced hydraulic cylinders 88. The cylinders are secured to side members 90 which extend downwardly on either side of the rack 72 and are pivotally secured at their ends to the guide members 76 by means of pins 92. A pair of cross plates 94 and 96 are welded or otherwise secured along opposite sides to the guide members 90 to complete the carriage structure. Hydraulic cylinder plungers 98 extend through both ends of the hydraulic cylinders 88 and are anchored to the main frame 26 at both ends by means of brackets 100. Thus, the plungers 98 act as guides for the hydraulic cylinders for controlling movement of the vertical carriage assembly 74.

It should be noted that when the upper half of the mold is in position in the rack 72, the point of support 92 is so located that a moment is created tending to rotate the rack assembly against the stop 86. This lessens the burden on the springs 84 and increases an initial straight pull on the upper half of the mold in breaking the mold halves apart.

Figure 3:
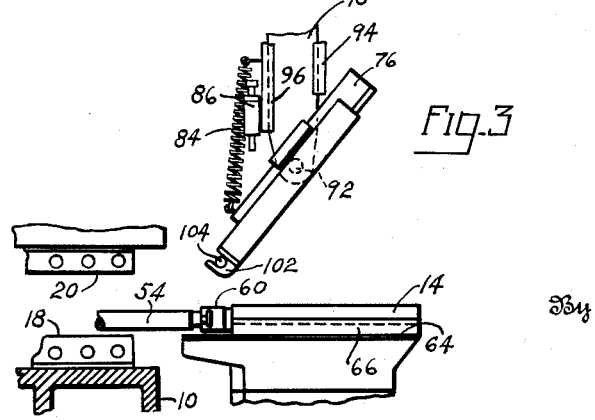
Fig. 3 is a fragmentary elevational view of the mold halves in the open position for removal of the molded articles and cleaning of the mold.

It is desirable not only to lift the top section of the mold but to tip it up on one edge so that the mold cavities are readily accessible for cleaning and servicing. To this end, a hook 102 is secured to one side of the top section 16 of the molds. A pin 104 supported by means of a bracket 106 secured to the frame 26 is so positioned that as the vertical carriage 74 lifts the top section of the mold off the bottom section, the hook 102 engages the pin 104, causing the mold to tilt about the pin 104 as a pivot point against the action of the springs 84. Fig. 3 shows the position of the top section of the mold at the top of the stroke of the vertical carriage 74.

To remove the molded article from the mold after the mold is opened up, mold-ejecting means is provided which includes a hydraulic motor 108 secured to the mold-supporting bracket 62. The hydraulic motor moves a plate 110 having a plurality of ejection rods 112. The hydraulic motor 108 is actuated to raise the rods against ejection pins which are built into the mold in a manner which is well known to the mold designing and building art.

In operation, the apparatus functions in the following manner: First, the hydraulic motors 36 are actuated to guide the two rows of hydraulic jacks into position on either side of the mold, then the hydraulic jacks are actuated to lift the upper platen to free the mold. The plunger 54, which has already engaged the T-slot 58 when the mold is indexed into position, is actuated by the hydraulic cylinder 52 to push the mold onto the mold-supporting surface 64. The hydraulic cylinders 88 are then actuated to raise the vertical carriage, thereby lifting and tilting upwardly the top section of the mold. The molded articles are then removed from the molds by means of the injector pins actuated by the hydraulic motor 108. The molded articles can be blown out of the space between the mold halves by a jet of air or manually picked out. The process is then reversed to close the mold and return it to position between the platens. The subsequent molds, which are indexed into servicing position by rotation of the rim 10, are handled in the same manner to provide continuous operation of the molding process.

The various operations performed by the mold-manipulating apparatus of the invention are carried out by hydraulic means. While the various operations can be initiated by manual control of suitable hydraulic valve means associated with each of the hydraulic motors, it will be appreciated that suitable electrical switching circuits and solenoid-operated valves can be utilized for controlling the sequence of operation in an entirely automatic fashion.

Although the invention has been particularly described in combination with a rotary-type molding press, the essential features of the invention are equally adaptable to other types of molding presses when it is necessary to withdraw the mold from between the platens to open and empty the mold.

From the above description, it will be seen that the various objects of the invention have been achieved by the provision of hydraulically actuated mold-manipulating apparatus which performs the various functions of removing, opening, and returning the mold in a continuous molding operation of a vulcanizing press. The apparatus of the invention is particularly suited to automatic operation, yet is not unduly complicated or complex. The result is a fast, relatively inexpensive, and efficient machine.

While in accordance with the patent statutes, one best known embodiment of the invention has been illustrated and described, it is to be particularly understood that the invention is not to be limited thereto or thereby, but that its scope is defined in the appended claims.

What is claimed is:

1. A mold manipulating apparatus for removing and opening a split-cavity mold that is normally held in clamped condition between opposed platens of a plane-platened general purpose vulcanizing press along which the mold may be moved in the absence of clamping pressure, the apparatus including a frame extending on either side of the press adjacent opposite sides of the mold, a horizontal carriage slidably supported by the frame, a plurality of hydraulic jacks independent of the press platens and carried by said carriage and positionable therewith between press platens of the press, the jacks being arranged in two spaced rows, hydraulic motor means for moving the carriage and associated jacks bodily into position between the platens on either side of the mold with the jacks in position directly to engage the platens, the jacks having means to actuate them to separate the platens for releasing the mold held therebetween, spaced parallel guide members mounted on the frame, the lower section of the split mold having horizontally extending grooves along the sides adapted to engage the guide members, hydraulic ram means engaging the mold for moving the mold from between the platens into sliding engagement with the guide members, a vertical carriage slidably supported by the frame directly above the guide members, a rack pivotally secured to the lower end of the vertical carriage, the upper section of the split mold having horizontally extending grooves along the sides adapted to engage the rack, hydraulic motor means for raising the vertical carriage to separate the mold sections, spring means secured between one edge of the rack and the vertical carriage for holding the rack horizontal, a hook on one side of the top section of the mold, and pin means secured to the main frame and adapted to engage the hook as the top mold section is raised whereby the mold section is tipped from the horizontal against the action of the spring means.

2. A mold manipulating apparatus for removing and opening a split-cavity mold that is normally held in clamped condition between opposed platens of a plane-platened general purpose vulcanizing press along which the mold may be moved in the absence of clamping pressure, the apparatus including a frame extending on either side of the press adjacent opposite sides of the mold, a horizontal carriage slidably supported by the frame, a plurality of hydraulic jacks independent of the press platens and carried by said carriage and positionable therewith between press platens of the press, the jacks being arranged in two spaced rows, hydraulic motor means for moving the carriage and associated jacks bodily into position between the platens on either side of the mold with the jacks in position directly to engage the platens, the jacks having means to actuate them to separate the platens for releasing the mold held therebetween, spaced parallel guide members mounted on the frame, the lower section of the split mold having horizontally extending grooves along the sides adapted to engage the guide members, means engaging the mold for moving the mold from between the platens into sliding engagement with the guide members, a vertical carriage slidably supported by the frame directly above the guide members, a rack pivotally secured to the lower end of the vertical carriage, the upper section of the split mold having horizontally extending grooves along the sides adapted to engage the rack, means for raising the vertical carriage to separate the mold sections, resilient means secured between one edge of the rack and the vertical carriage for holding the rack horizontal, a hook on one side of the top section of the mold, and pin means secured to the main frame and adapted to engage the hook as the top mold section is raised whereby the mold section is tipped from the horizontal against the action of the resilient means.

3. A mold manipulating apparatus for removing and opening a split-cavity mold that is normally held in clamped relation between opposed platens of a plane-platened general purpose vulcanizing press along which the mold may be moved in the absence of clamping pressure, the apparatus including a frame adjacent opposite sides of the mold, a horizontal carriage slidably supported by the frame and positionable between the press platens, hydraulic means independent of the press platens and mounted on said carriage, means for moving the carriage and associated hydraulic means into position between the platens on either side of the mold with the hydraulic means in position to engage the platens of the press directly, said hydraulic means being adapted to separate the platens for releasing the mold held therebetween without releasing the pressing force acting to hold said platens in clamping relation against said mold, spaced parallel guide members mounted on the frame, the lower section of the split mold having horizontally extending grooves along the sides adapted to engage the guide members, means engaging the mold for moving the mold from between the platens into sliding engagement with the guide members, a vertical carriage slidably supported by the frame directly above the guide members, a rack pivotally secured to the lower end of the vertical carriage, the upper section of the split mold having horizontally extending grooves along the sides adapted to engage the rack, means for raising the vertical carriage to separate the mold sections, resilient means secured between one edge of the rack and the vertical carriage for holding the rack horizontal, a hook on one side of the top section of the mold, and pin means secured to the main frame and adapted to engage the hook as the top mold section is raised whereby the mold section is tipped from the horizontal against the action of the resilient means.

4. A mold manipulating apparatus for removing and opening a split-cavity mold that is normally held clamped between opposed platens of a vulcanizing press, the apparatus including a frame independent of and extending on either side of the press adjacent opposite sides of the mold, a horizontal carriage slidably supported by the frame, a plurality of hydraulic jacks carried by said carriage, the jacks being arranged in two spaced rows for insertion between the press platens at the sides of the mold, a hydraulic motor means for moving the carriage and associated jacks into position between the platens on either side of the mold, the jacks being engageable directly with the press platens and being actuated to separate the platens for releasing the mold held therebetween without release of the platen pressing force from the press platens, spaced parallel guide members mounted on the frame, the lower section of the split mold having horizontally extending grooves along the sides adapted to engage the guide members, means engaging the mold for moving the mold from between the platens into sliding engagement with the guide members, a vertical carriage slidably supported by the frame directly above the guide members, a rack pivotally secured to the lower end of the vertical carriage, the upper section of the split mold having horizontally extending grooves along the sides adapted to engage the rack, and means for raising the vertical carriage to separate the mold sections.

5. Mold handling apparatus for manipulating split molds normally held clamped between opposed platens of a vulcanizing press, said apparatus including mold releasing means independent of said press and engageable between said platens adjacent the mold, said means being actuated to separate the platens by direct engagement therewith and release the mold therebetween, means for moving said mold releasing means into and out of position between the platens, fixed guide means adjacent the mold to one side of the press, means engaging the mold for moving the mold from between the platens, said guide means slidably engaging the lower section of the split mold as the mold is moved from between the platens, a rack adapted to slidably engage the top section of the split mold, means pivotally supporting the rack, said means being adapted to raise and lower said rack for separating said mold sections, resilient means normally holding said rack horizontally, and means secured to the press and releasably engaging the top section of the mold adjacent one side thereof, said last-named means tilting the mold section and rack when said rack support means are actuated to separate the mold sections.

6. Mold handling apparatus for manipulating split molds normally held clamped between opposed platens of a vulcanizing press, said apparatus including mold releasing means independently of said press for being slidably positioned intermediate said platens adjacent the mold, said means being actuated to separate the platens against their clamping force and release the mold therebetween, means for moving said mold releasing means into and out of position between the platens, fixed guide means adjacent the mold to one side of the press, means engaging the mold for moving the mold from between the platens, said guide means slidably engaging the lower section of the split mold as the mold is moved from between the platens, a rack adapted to slidably engage the top section of the split mold, and means supporting the rack, said means being adapted to raise and lower said rack for separating said mold sections.

7. A mold manipulating apparatus for removing and opening a split-cavity mold that is normally held clamped between opposed platens of a vulcanizing press, the apparatus including a frame independent of the press and extending on either side of the press adjacent opposite sides of the mold, a horizontal carriage slidably supported by the frame, a plurality of hydraulic jacks carried by said carriage, the jacks being arranged in two spaced rows, hydraulic motor means for moving the carriage and associated jacks into position between the platens on either side of the mold, the jacks being actuated to separate the platens against their clamping force for releasing the mold held therebetween, fixed guide means adjacent the mold to one side of the press, and means engaging the mold for moving the mold from between the platens and onto said guide means.

8. In a mold handling apparatus for manipulating split molds normally held clamped between opposed platens of a vulcanizing press, said apparatus including mold releasing means independent of said press for being slidably positioned intermediate said platens adjacent the mold, said means being actuated to separate the platens and release the mold therebetween, means for moving said mold releasing means into and out of position between the platens, fixed guide means adjacent the mold to one side of the press, and means engaging the mold for moving the mold from between the platens onto the guide means.

9. In combination, a pair of spaced platens having pressure exerted thereon to urge the platens toward each other, platen separating means supported independent of said platens for positioning intermediate the platens when a mold is engaged therebetween for separating the platens when the platen separating means are actuated, means for moving the platen separating means intermediate the platens, and guide means for receiving a mold from a position intermediate the platens.

References Cited in the file of this patent

UNITED STATES PATENTS

| | | |
|---|---|---|
| 1,414,507 | Gammeter | May 2, 1922 |
| 1,641,922 | Davis | Sept. 6, 1927 |
| 1,750,424 | Olson | Mar. 11, 1930 |
| 2,138,047 | Turner | Nov. 29, 1938 |